United States Patent Office 3,509,074
Patented Apr. 28, 1970

3,509,074
PROCESS FOR PREPARING HIGHLY POLYMERIZED ISOBUTYLENE OXIDE POLYMERS, AND THE POLYMERS AND ARTICLES THEREOF
Kosaku Kamio, Uozu-shi, Motoyuki Kuwana, Namerikawa-shi, and Shigeo Nakada, Uozu-shi, Japan, assignors to Nippon Carbide Kogyo Kabushiki Kaisha, Tokyo, Japan
No Drawing. Continuation-in-part of application Ser. No. 606,444, Dec. 29, 1966. This application Feb. 28,, 1968, Ser. No. 708,789
Int. Cl. C08g 23/14
U.S. Cl. 260—2                              6 Claims

ABSTRACT OF THE DISCLOSURE

Highly polymerized polymers of isobutylene oxide and interpolymers of isobutylene oxide with other epoxides containing at least 70% polymerized isobutylene oxide. Method of preparing these polymers and interpolymers by polymerizing in the presence of an organozinc compound having a formula ZnRR' where R and R' are hydrocarbon radicals, water and monoamines having the formula $R_1$—NH—$R_2$ wherein $R_1$ is a hydrogen or a hydrocarbon radical selected from the group of alkyl, cycloalkyl, aryl and aralkyl having up to 18 carbon atoms and $R_2$ is alkyl, cycloalkyl, aryl or aralkyl with up to 18 carbon atoms. Also shaped products such as fibers and films comprised of said highly polymerized polymer or interpolymer and the method of preparing these shaped products.

This application is a continuation-in-part of U.S. patent application Ser. No. 606,444 filed Dec. 29, 1966, which is a continuation of U.S. patent application Ser. No. 266,827 filed Mar. 21, 1963, both now abandoned.

The present invention relates to a process for preparing polymers and copolymers of isobutylene oxide having a high degree of polymerization. Also, the invention relates to the finished products prepared from the isobutylene oxide high polymers and to the process for preparing them. More particularly, this invention relates to a process for preparing highly polymerized isobutylene oxide polymers useful as filaments, films and other fabricated articles which comprises polymerizing isobutylene oxide containing at least 70% of the isobutylene oxide in the presence of an organo-zinc compound represented by the general formula ZnRR' (wherein R and R' are hydrocarbon radicals), water and monoamines represented by the general formula $R_1$—NH—$R_2$ (wherein $R_1$ is a member selected from the group consisting of hydrogen and hydrocarbon radicals selected from alkyl, cycloalkyl, aryl and aralkyl groups with up to 18 carbon atoms, and $R_2$ is a hydrocarbon group selected from alkyl, cycloalkyl, aryl and aralkyl groups with up to 18 carbon atoms) and to a process for preparing from the highly polymerized polymers and copolymers of isobutylene oxide thus made useful shaped products such as fibres and films, as well as to the shaped products themselves.

Hitherto the polymerization of olefin oxides has been tried in various ways and the synthesis of high polymers from such olefin oxides as ethylene oxide and propylene oxide which have relatively simple structure has been achieved through several methods. However, generally speaking, the polymerization of ethylene oxide derivatives becomes more difficult as the number of substituted groups increases and especially the polymerization of olefin oxides such as isobutylene oxide which has two substituted groups on one carbon atom (1,1-disubstituted ethylene oxide) has been considered to be very difficult. While it has been known that isobutylene oxide having two methyl groups on one carbon atom is polymerizable utilizing the organometallic compounds as catalysts, the polymer of high molecular weight therefrom has been considered to be unobtainable due to the steric hindrance of the methyl groups, and none of the available literature prior to this invention has described the existence of high polymers which are utilizable as the raw material for practical finishing. The poly-isobutylene oxides with a low degree of polymerization are very brittle and frail substances which can not provide useful finished products, and due to the brittleness they have hardly been processable into fibers of films by stretching.

Various catalysts have been proposed heretofore either directly or inferentially for the polymerization of isobutylene oxide. Among these catalysts there may be mentioned triethyl aluminum, diethyl zinc, ferric chloride, titanium tetrachloride, boron trifluoride etherate, and such catalyst systems as triethyl aluminum-$H_2O$-chelating agent. However, as indicated above all heretofore produced polymers had a low degree of polymerization and have been too brittle and frail to serve in the fabrication of such useful products as fibers and films. These heretofore known polymers have had melting points lower than 160° C., generally in the range of 127–155° C. and are soluble in hot tetrahydrofuran, dioxane and dimethyl formamide. Moreover, these heretofore produced polymers have exhibited a reduced specific viscosity value of lower than 0.25 (dl./g.). The value of reduced specific viscosity is the measured value of viscosity at 110° C. of a solution of the polymer having a concentration of 0.1 g./100 ml. at 110° C. that was prepared by dissolving the polymer in o-dichlorobenzene containing 0.03% by weight of 2,6-di-tertiary-butyl-p-cresol in a nitrogen stream at a temperature of 140° C. for one hour.

The isobutylene oxide homopolymers of the present invention are characterized by containing an insoluble fraction above 90% when immersed in acetone at room temperature for 24 hours or in a hot tetrahydrofuran at 67° C. for 2 hours.

The interpolymers which are prepared according to this invention and containing at least 70% polymerized isobutylene oxide also have a reduced specific viscosity of at least 1.0 (dl./g.) but sometimes have a melting point somewhat lower than 160° C.

Such interpolymer, however, still passes the desirable properties described herein as long as their reduced specific viscosity is higher than 1.0 (dl./g.). The interpolymers of the present invention are characterized by containing an insoluble fraction above 50% when immersed in acetone at room temperature for 24 hours or in a hot tetrahydrofuran at 67° C. for 2 hours.

Therefore, an object of the present invention is to provide a process for preparing high molecular weight polymers and copolymers of isobutylene oxide which have never been achieved by conventional methods. Another object of the present invention is to provide a process for preparing the novel high polymers and copolymers. It is another object of this invention to provide the finished products such as fibres and films from the high polymerized isobutylene oxide polymers and the process for preparing them.

By the polymerization method of the present invention, it is possible to achieve the synthesis of highly polymerized isobutylene oxide polymers which can be used as raw material for finishing.

The term highly polymerized isobutylene oxide polymers as herein used indicates those having a reduced specific viscosity of at least 1.0 measured at 110° C. upon 0.1 g./100 ml. solution which is prepared by dissolving the said polymers into o-dichlorobenzene containing 0.03% by weight of 2,6-di-tertiary-butyl-p-cresol at 140° C. under a nitrogen atmosphere for 1 hour. (The values of the reduced specific viscosity hereafter used are those determined under the same condition as above.) Isobutylene oxide high polymers having a reduced specific viscosity of higher than 1.0 (dl./g.) have generally a fixed melting point of about 164° to 168° C. and they are practically insoluble in hot tetrahydrofuran, dioxane and dimethyl formamide.

By proper selection of polymerization conditions, there can be obtained highly polymerized isobutylene oxide polymers having a reduced specific viscosity even higher than 4.0. The isobutylene oxide high polymers of the present invention are highly crystalline polymers and are difficultly soluble in most organic solvents. It has been found that the highly polymerized isobutylene oxide polymers prepared according to the present invention provide a novel synthetic material for finishing and that finished products prepared therefrom show a sufficient toughness for practical use. As a result of further studies, we have succeeded in producing fibres and films by stretching the new synthetic material in one or more directions. Moreover the fibres and films thus formed have remarkable toughness, outstanding strength and other desirable characteristics compared with conventional products.

The process for preparing the highly polymerized polymers and copolymers of isobutylene oxide according to the present invention will be made more clear by the following description.

The organozinc compounds used in the present invention are represented by the formula ZnRR′, wherein R and R′ are hydrocarbon radicals, preferably alkyl radicals having 1 to 8 carbon atoms. For example, dimethylzinc, diethylzinc, di-n-propylzinc, di-n-butylzinc, di-n-hexylzinc, di-n-octylzinc, ethyl-n-propylzinc, ethyl-t-butylzinc, n-propyl-isobutylzinc, isobutyl-isopentylzinc can be effectively used. Even the use of the two component catalysts consisting of the above organozinc compound and water can produce relatively high polymers if polymerization conditions are properly selected. However, the present invention is characterized by the use of one or more monoamines as a third component. The third component is selected from primary and secondary monoamines represented by the general formula $R_1$—NH—$R_2$ (wherein $R_1$ is a member selected from the group consisting of hydrogen and hydrocarbon radicals selected from alkyl, cycloalkyl, aryl and aralkyl groups with up to 18 carbon atoms, and $R_2$ is a hydrocarbon group selected from alkyl, cycloalkyl, aryl and aralkyl groups with up to 18 carbon atoms).

Examples of suitable alkyl groups are methyl, ethyl, n-propyl, isopropyl, n-butyl, isobutyl, sec-butyl, tert-butyl, n-pentyl, neopentyl, n-hexyl, isohexyl, n-heptyl, n-octyl, n-decyl, n-dodecyl and n-octadecyl.

Examples of cycloalkyl groups are cyclohexyl, cyclooctyl, 4-methylcyclohexyl, 2-ethylcyclohexyl, and cyclohexylmethyl. The aryl groups may contain 2-, 3- or 4- benzen nuclei and include phenyl, o-toluyl, p-toluyl, m-toluyl, p-ethylphenyl, 2,6-dimethylphenyl, 2,3-dimethylphenyl, 2,4-dimethylphenyl, p-n-propyl-phenyl, p-isopropyl-phenyl, 2,4,5-trimethyl phenyl, 2,4,6-trimethyl phenyl, p-n-butyl phenyl, p-octyl phenyl, p-dodecyl phenyl, α-naphthyl, β-naphthyl, α-methyl-β-naphthyl, 9-anthracenyl, 9-phenanthrenyl, 5-naphthacenyl, 6-chrysenyl and 1-triphenylenyl.

Suitable aralkyl groups are benzyl, p-toluyl methyl, 2-phenyl ethyl, 4-phenyl butyl, p-n-butyl phenyl methyl, β-naphthyl methyl, 9-anthracenyl methyl and 5-naphthacenyl methyl.

Examples of the suitable monoamines are as follows: methylamine, ethylamine, propylamine, isopropylamine, n-butylamine, isobutylamine, sec-butylamine, tert-butylamine, pentylamine, hexylamine, cyclohexylamine, heptylamine, dodecyclamine, octadodecylamine, dimethylamine, diethylamine, dipropylamine, dibutlyamine, dihexylamine, dicyclohexylamine, dioctylamine, dioctadecylamine, methylethylamine, methylpropylamine, methylbutylamine, ethylbutylamine, aniline, α-naphthylamine, β-naphthylamine, o-toluidine, p-toluidine, p-ethylaniline, p-butylaniline, benzylamine, α-phenylethylamine, β-phenylethylamine, N-methylaniline, N-ethylaniline, N-butylaniline, diphenylamine, phenyl-α-naphthylamine, etc.

By adding these primary or secondary monoamines to the organozinc-water catalytic system, the degree of polymerization can be remarkably elevated. Addition of the catalyst, the promotor and the monomers to the polymerization system can be carried out in various ways. For example, in one method the reaction product of the organozinc compound, water and amines is used as catalyst, in a second method amines and monomers are added to the reaction product of organozinc compound and water, in a third method each component of the catalyst and monomers are initially and simultaneously added together. It is possible to carry out any of above methods at lower temperatures. As solvents, hydrocarbons inert or substantially inert to the organozinc compounds, such as n-pentane, n-hexane, heptane, octane, isooctane, petroleum ether, petroleum benzine, ligroin, benzene, toluene, xylene, either alone or in solvent mixture of two or more of the above solvents can be selected. The amount of the organozinc compounds to be used is not particularly critical, but usually use of 0.05–20 parts of organozinc compounds, 0.01–5 parts of water and 0.01–20 parts of amines are preferable per 100 parts of isobutylene oxide, all parts being by weight. The relative ratio between organozinc compounds, water and amines has a significant influence on the degree of polymerization and by changing this ratio within the range of 1:0.1–1.0:0.01–1.0 polymers with the desired degree of polymerization are obtained. A preferred molar ratio is 1:0.2–0.7:0.1–0.8 (zinc compound:water:monoamine). In the process of the present invention, the co-presence of the organozinc compounds represented by the formula ZnRR′, water and monoamines are essential and no one or two components thereof may be omitted. This fact will be clear from the examples shown hereafter.

The polymerization temperature is not critical, but temperatures between 0° and 200° C. are preferable.

As indicated above the isobutylene oxide may be copolymerized with at least one other epoxide to produce interpolymers containing at least 70% polymerized isobutylene oxide. The other epoxides that are effectively copolymerizable with isobutylene oxide according to the present invention are those represented by the formula:

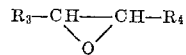

wherein $R_3$ is hydrogen or an alkyl group containing up to 2 carbon atoms, when $R_3$ is hydrogen $R_4$ is (a) an alkyl, alkenyl or aryl group with up to 12 carbon atoms, (b) —$CH_2$—$OR_5$ or (c)

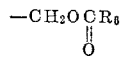

wherein $R_5$ and $R_6$ are alkyl, cycloalkyl alkenyl or aryl with up to 18 carbon atoms; when $R_3$ is a hydrocarbon group both $R_3$ and $R_4$ are alkyl groups with up to two carbon atoms which may form o closed 4 carbon ring. Examples of $R_3$ are hydrogen, methyl and ethyl groups. Examples of $R_4$ are hydrogen, methyl ethyl, n-propyl, isopropyl, n-butyl, tert-butyl, n-hexyl, cyclohexyl 1-methyl cyclohexyl, 4-methylcyclohexyl, n-octyl, n-decyl, n-dodecyl, ethenyl, propenyl, isopropenyl, α-ethylethenyl, α-butylethenyl, α-octylethenyl, phenyl benzil, p-toluyl, p-butylphenyl, p-octylphenyl, α-naphthyl and β-naphthyl.

Examples of $R_5$ and $R_6$ are methyl, ethyl, n-propyl, isopropyl, n-butyl, sec-butyl, tert-butyl, n-hexyl, n-octyl, 2-ethyl-hexyl, n-dodecyl, n-octadecyl, cyclohexyl, 1-methylcyclohexyl, 4-methylcyclohexyl, ethenyl, propenyl, isopropenyl, 2-methyl-propenyl, 2-ethyl propenyl, α-ethyl ethenyl, α-butyl ethenyl, α-octyl ethenyl, phenyl, o-toluyl, p-toluyl, m-toluyl, p-ethylphenyl, 2,6-dimethylphenyl, 2,4-dimethylphenyl, p-n-butylphenyl, p-n-octylphenyl, α- naphthyl, β-naphthyl, 9-anthracenyl, 9-phenanthrenyl and 5-naphthacenyl.

Examples of

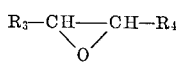

in which $R_3$ and $R_4$ form a closed 4 carbon ring are cyclohexene oxide and 3-methyl cyclohexene oxide.

Examples of suitable other copolymerizable epoxides are as follows: ethylene oxide, propylene oxide, 1-butylene oxide, 2-butylene oxide, cyclohexene oxide, allyl-glycidyl ether, glycidyl methacrylate, phenyl glycidyl ether, p-methylphenyl glycidyl ether, methyl glycidyl ether, ethyl glycidyl ether, propyl glycidyl ether, cyclohexyl glycidyl ether, tert-butyl glycidyl ether, n-octadecyl glycidyl ether and other glycidyl ether derivatives, which are free of functional groups which reacts with and destroys the polymerization catalyst. It is also possible to modify the polyisobutylene oxide by copolymerizing one or more of the above compounds with the isobutylene oxide containing more than 70% by weight of the isobutylene oxide.

As previously indicated, the synthetic raw material for shaping used in the present process are polyether polymers containing at least 70% by weight of isobutylene oxide and having a reduced specific viscosity of 1.0 or more. It is difficult to produce excellent fibres or films by shaping polyisobutylene oxide having a reduced viscosity lower than 1.0. One of the reasons for difficulty in shaping the polyisobutylene oxides with such a low degree of polymerization is attributed to the formation of inferior side products in high ratio. Another reason is the instability and the brittleness of the fibres and films prepared from the material of such a low degree of polymerization. However, polyisobutylene oxides having a reduced specific viscosity higher than 1.0 (dl./g.) of this invention can be easily shaped and can provide general shaped articles of good quality, such as fibres and films, etc. As shaping methods of fibres and films, there may be mentioned melt spinning, T-die extruding and inflation blowing. In order to produce the stretched fibres and films of the present invention, it is required to stretch the material to at least twice its unstretched dimension, preferably 4 to 30 times. This stretching operation can be carried out either by stretching the raw material in the fluid state while shaping, or by stretching the material once shaped while heating again. Suitable temperatures for stretching are generally between 100 and 190° C., but these vary with the degree of polymerization of the polyisobutylene oxide used, and with the ratio of the comonomers added to the material. It also depends on amounts of additives, etc. The polymer can be melt extruded into films and filaments which are stretched while molten or after cooling and reheating. The film can be ordinarily stretched by tensing in one or multi directions.

A stretched film is also obtained by e.g. passing a sheet of the polymer between rollers under sufficient pressure to reduce the thickness of the sheet to the desired thickness of the final film. It is also desirable to add additives such as stabilizers to the material of the present invention.

As a result of the heat stretching operation mentioned above, the finished products of the present invention exhibit strength some five to fifty times higher than those prepared without such stretching operations.

The fibres prepared according to the present invention have such a dimensional stability that they do not shrink in boiling water and show a large tensile strength and a small elongation. Furthermore, one of the remarkable effects of the stretching is seen in the clarification of the films. It is not yet possible to obtain transparent films without stretching from the highly polymerized polyisobutylene oxides, but we have found that the opaque films can be clarified by heat stretching, Furthermore, while the films and filaments not stretched have very poor bending strength and lose the transparency and are embrittled by simple bending, the stretched finished products show surprisingly high bending strength and impact strength. In folding endurance tests carried out on unstretched film with a thickness of 0.3 mm. which is prepared by processing polyisobutylene oxide having a reduced specific viscosity of 3.55, the film is damaged by folding only two times. On the other hand, the same film prepared with stretching is not impaired even after folding 300 times in the same test. While the film of the polyisobutylene oxide prepared without stretching can not be used in practical applications, the heat stretched film of the present invention is satisfactory for practical use. Thus, it is to be understood that by carrying out finishing according to the present invention, novel and excellent finished product having markedly different properties compared with those finished in other ways can be obtained. Moreover, the isobutylene oxide polymers show an excellent affinity to dyes such as Celliton dyestuffs, when compared with usual polyolefins. This affinity to dyes also constitutes one of the advantages of the polymers prepared according to the present invention.

The fibres of the present invention are completely free from shrinking in boiling water and show a large tensile strength, a small elongation and good affinity to dyes. Moreover the films of the present invention are transparent and show a large tensile strength, bending strength, impact strength, tear strength and a small elongation.

The highly polymerized isobutylene oxide polymers prepared by the process of the present invention exhibit the following properties: melting point generally above 164° C. (in case of isobutylene oxide high homopolymer), a reduced specific viscosity (dl./g.) as above defined of at least 1, may be drawn into filaments, may be heat-stretched to form excellent films, may be mold processed by spinning or extruding, exhibit an impact strength (kg./cm.$^2$) as measured by Dienstadt testing machine (method of testing DIN 53452, sample used for testing; unstretched plate of 2 mm. and 10 x 15 mm.) of more than 3.4, exhibit tensile strength (kg./cm.$^2$) of more than 350 (method of testing; ASTM D–412–51T, samples used for testing; unstretched plate of dumbbell shape with thickness of 1 mm.) and are substantially insoluble in hot tetrahydrofuran, dioxane and dimethylformamide.

The present invention is further illustrated by the following examples which are not to be considered as limiting the scope of the present invention.

EXAMPLE 1

Into a sealed tube, made of stainless steel, are introduced 82 parts of n-hexane, 0.38 part of water and 1.3 parts of cyclohexylamine. Then the tube is flushed by nitrogen gas. Thereafter, 8.6 parts of diethyl zinc in n-hexane solution is added and after sealing the tube, the whole is shaken while cooling by water. After 30 minutes the tube is opened in a nitrogen gas stream and 100 parts of isobutylene oxide is charged. After sealing, the tube is left standing in a thermostat at 70° C. for 42 hours. A slightly elastic white mass is obtained. In order to eliminate the catalyst residue from the polymer thus obtained, the polymer is milled in 50% acetic acid, aqueous solution filtered, washed by water and then by methanol and dried. White crystalline polymer is obtained with the yield being 65%. The reduced specific viscosity of this polymer (determined in 0.1 g./100 ml. dichlorobenzene at 110° C.) is 3.85, melting point 166° C. This polymer is easily processed in the molten state and the finished products show excellent mechanical properties. When other amines such as diethyl amine, diphenyl amine, aniline and benzyl amine are used in place of cyclohexyl amine, similarly, tough polymers are obtained.

Reference Example 1

By operating as in Example 1 but where cyclohexyl amine is excluded, a yield of 62% is obtained. The reduced specific viscosity is 2.30 (melting point 165° C.).

Reference Example 2

By operating as in Example 1 but where water is excluded, a result is obtained which is still worse than Reference Example 1.

EXAMPLE 2

By operating as in Example 1 but where 0.5 part of water and 0.95 part of cyclohexyl amine are used, a yield of 100% is obtained. The reduced specific viscosity is 3.07 (melting point 165° C.).

Reference Example 3

By operating as in Example 2 but where cyclohexyl amine is excluded, a yield of 85% is obtained. The reduced specific viscosity is 1.40 (melting point 165° C.).

EXAMPLE 3

By operating as in Example 1 but where 1.9 parts of cyclohexyl amine is used, a yield of 60% is obtained. The reduced specific viscosity is 4.15 (melting point 166° C.).

EXAMPLE 4

Into sealed tube, made of stainless steel, 125 parts of n-hexane, 0.25 part of water, 1.66 parts of cyclohexyl amine and 100 parts of isobutylene oxide are introduced and the tube is flushed by nitrogen gas. Thereafter 6.8 parts of diethyl zinc in n-hexane solution is added and the tube is sealed. After shaking for 30 minutes while cooling by water, the tube is left standing in a thermostat at 80° C. for 46 hours. The treatment thereafter is carried out as Example 1. The yield of polymer is 76% and the reduced specific viscosity is 3.96 (melting point 166° C.).

EXAMPLE 5

By operating as in Example 4 but where 1.56 parts of aniline is used in place of cyclohexyl amine, a yield of 88% is obtained. The reduced specific viscosity of the polymer obtained is 3.45 (melting point 166° C.).

EXAMPLE 6

By operating as in Example 4 but where 1.06 parts of t-butylamine is used in place of cyclohexyl amine, a yield of 38% is obtained. The reduced specific viscosity of the polymer obtained is 3.77 (melting point 166° C.).

EXAMPLE 7

By operating as in Example 1 but where 90 parts of isobutylene oxide and 10 parts of propylene oxide are charged in place of 100 parts of isobutylene oxide, a yield of 94% is obtained. The reduced specific viscosity of the copolymer obtained is 2.36.

As the ratio of propylene oxide to isobutylene oxide increases the elasticity of the resulting polymers is enhanced and in each case the polymers are tough.

EXAMPLE 8

By operating as in Example 4 but where 90 parts of isobutylene oxide and 10 parts of phenyl glycidyl ether are charged in place of 100 parts of isobutylene oxide, a yield of 87% is obtained. The reduced specific viscosity of the polymer obtained is 2.59.

EXAMPLES 9–13

The polymerizations were carried out, each using a different kind of primary or secondary amine as a catalyst component. The reagents used and their quantities were as follows:

Isobutylene oxide—10 ml. (100 parts by wt.)
n-Hexene—15 ml. (125 parts by wt.)
Diethyl zinc—0.548 g. (6.85 parts by wt.)
Water—0.020 ml. (0.25 parts by wt.)
Amine—0.0133 mol per 1 mol isobutylene oxide Into a 100 ml. glass tube under a nitrogen atmosphere, water, isobutylene oxide, amine and n-hexane were placed in order of mention, and finally a solution of diethyl zinc in n-hexane was added. The glass tube was sealed, shaken for 30 minutes at 0° C. and dipped in a thermostat of 90° C. to effect static polymerization for 42 hours. Then, methanol was added to stop the polymerization. The polymer thus obtained was crushed in an aqueous solution of 10% acetic acid and then washed with water, ammonia water and water in order of mention, and vacuum-dried at normal temperature. The results are shown in Table 1.

TABLE 1

| Example No. | Monoamine | Polymerization rate (percent) | Reduced specific viscosity (dl./g.) | Melting point of polymer (° C.) |
|---|---|---|---|---|
| 9 | Octadecylamine | 85.0 | 3.61 | 165 |
| 10 | α-Phenylethylamine | 88.5 | 3.81 | 166 |
| 11 | β-Phenylethylamine | 86.1 | 3.22 | 165 |
| 12 | Diethylamine | 92.0 | 3.08 | 165 |
| 13 | N-methyl aniline | 85.7 | 3.31 | 166 |

EXAMPLE 14

In a 10 liter autoclave, 0.1 part of water, 0.5 part of cyclohexylamine, 140 parts of n-heptane and 100 parts of isobutylene oxide were added and sealed. While cooling the autoclave with water, nitrogen was forced under a pressure of 5 atmospheres into the autoclave and air was purged to the extent of the normal pressure. This procedure was repeated five times. While the contents of autoclave was stirred a mixture of 4.0 parts of di-n-butylzinc and 20 parts of n-heptane was forced under pressure through an adding tube. The temperature was raised to 80° C., the mixture was polymerized for 45 hours with stirring at rotations of 200 r.p.m. After polymerizing for the predetermined hours, 10 parts of methanol was added and the polymerization was stopped. The polymer was obtained as a lump, this was crushed to pieces and soaked for five hours in a solution of 5% acetic acid. Then, it was washed by water, again soaked in 5% ammonia water, and washed by water. After the polymer slurry was dehydrated, it was dried in a dryer with heated air at 50° C. The yield of the polymer was 96%, and the reduced specific viscosity was 3.55 (dl./g.).

EXAMPLE 15

In a 10 liter autoclave, 0.12 part of water, 0.4 part of aniline, 145 parts of n-heptane, 95 parts of isobutylene oxide, 5 parts of propylene oxide were added and sealed.

While cooling the autoclave by water, nitrogen was forced into the autoclave under a pressure of 5 atmospheres and air was purged to the extent of the normal pressure. This procedure was repeated five times. Then 15 parts of n-heptane containing 2.5 parts of diethylzinc was added, while stirring the contents of the autoclave.

The temperature was raised to 80° C., and the mixture was polymerized for 28 hours with stirring rotations of 200 r.p.m. After polymerizing the predetermined period, 10 parts of methanol was added and the polymerization was terminated. After-treatment of the polymer obtained in a lump was followed as described in Example 15.

The yield of the polymer was 69% and the reduced specific viscosity of the polymer obtained was 2.78 (dl./g.). The propylene oxide contained in the polymer was about 7%.

EXAMPLE 16

Substituting 0.16 part of water and 0.20 part of diethylamine instead of cyclohexylamine, the reagents used in Example 14 are used here in the same quantities.

The polymerization temperature was 70° C. and the period of polymerization was 45 hours. After-treatment of the obtained polymer was the same way as in Example 14.

The yield of the polymer was 89%, the reduced specific viscosity of the obtained polymer was 2.56 (dl./g.), and the melting point thereof was 166° C.

EXAMPLE 17

In a 10 liter autoclave, 0.2 part of water, 0.2 part of n-butylamine, 80 parts of n-hexane and 100 parts of isobutylene oxide were added and sealed.

While cooling the autoclave with water, then nitrogen was forced into the autoclave under pressure of 5 atmospheres and air was purged to the extent of the normal pressure. This procedure was repeated five times. Then, a mixture of 2.8 parts of diethylzinc and 20 parts of n-hexane was forced into the autoclave via an adding tube, while stirring the contents of the autoclave.

The temperature was raised to 55° C., and the mixture is polymerized for 45 hours with stirring rotations of 200 r.p.m.

After the predetermined period, 12 parts of methanol was added and the polymerization was terminated.

A part of the polymer was a lump, however, most part was obtained in powder. The after-treatment of the polymer was the same as that of Example 14.

The yield of the polymer was 86%, the reduced specific viscosity was 3.07 (dl./g.) and the melting point thereof was 166° C.

EXAMPLES 18–29

In a nitrogen atmosphere, the amounts of reagents shown in Table 2 were added to a 100 ml. glass sealed tube (pressure proof 10 kg./cm.$^2$) in the order of water, isobutylene oxide, other oxide, monoamine and n-hexane, at least n-hexane solution of organozinc compound was added and the tube was sealed.

After the mixture was shaken at 0° C. for 30 minutes, it was polymerized stationarily in a constant temperature bath of 80° C. for 45 hours.

After the predetermined period, a small amount of methanol was added and then the polymerization was terminated.

Next, the obtained polymer was powdered in 10% of acetic acid, then it was washed in the order of water, 5% ammonia and water, and then it was dried in vacuum at room temperature. The result of the polymerization is shown in Table 2.

EXAMPLE 31

A film prepared from the polymer of Example 15 is prepared by stretching in three directions having angles of 60°. This film has a tensile strength of 741 kg./cm.$^2$.

EXAMPLE 32

100 parts of powdered isobutylene oxide polymer having a reduced specific viscosity of 2.56 (M.P. 166° C.) prepared as in Example 16 together with 0.25 part of phenyl-β-naphthylamine as a stabilizer were well mixed under agitation in a mixer. This mixture was extruded through a 3 mm. hole of a melt extruder at 200° C. to give pellet-like formed materials. The reduced specific viscosity of the material obtained was 2.32 (dl./g.).

This material was extruded by means of a melt spinning machine (a screw extruder of 25 mm. in diameter; nozzle of 0.7 mm. in diameter; 50 holes), maintaining the die temperature at 210° C., to be spun at a taking-up speed of 20 m./min. The unstretched fibres thus obtained were stretched treble in polyethylene glycol at 150° C. to produce tough fibres having a good affinity for dyes.

Table 3 shows the physical properties of the fibers, unstretched and stretched.

TABLE 3

| Fibers | Tensile strength (g./denier) | Elongation (percent) |
|---|---|---|
| Unstretched | 1.5 | 450 |
| Stretched | 4.6 | 68 |

EXAMPLE 33

100 parts of powdered isobutylene oxide polymer as prepared in Example 17 having a reduced specific viscosity of 3.07 (M.P. 166° C.) together with 0.25 part of phenyl-β-naphthylamine as a stabilizer were well mixed under agitation in a mixer. This mixture was extruded through a 3 mm. hole of a melt extruder at 200° C. to give pellet-like formed materials. The reduced specific viscosity of the material was 2.82 (dl./g.).

This material was extruded by means of a T-die at the die temperature of 230° C. to produce a film having a

TABLE 2

[Isobutylene oxide, 95 parts; n-Hexane, 120 parts; Polymerization temperature, 80° C.; Other epoxide, 5 parts; water, 0.3 part; Polymerization time, 45 hrs.]

| Example No. | Other epoxide | Monoamine | Parts | Organzinc compound | Parts | Polymerization yield, percent | Reduced specific viscosity dl./g. |
|---|---|---|---|---|---|---|---|
| 18 | Ethylene oxide | Cyclohexylamine | 1.00 | Diethylzinc | 5.12 | 87 | 2.10 |
| 19 | do | β-Naphthylamine | 1.43 | Ethyl-isopropylzinc | 5.66 | 80 | 2.12 |
| 20 | Propylene oxide | Dicyclohexylamine | 1.85 | Di-n-butylzinc | 7.40 | 62 | 2.69 |
| 21 | do | Isopropylamine | 0.60 | Ethyl-isopropylzinc | 5.66 | 99 | 2.64 |
| 22 | Styrene oxide | Aniline | 1.05 | Diethylzinc | 5.12 | 38 | 1.34 |
| 23 | Phenyl glycidyl ether | Benzylamine | 1.08 | Di-n-butylzinc | 7.40 | 78 | 2.81 |
| 24 | do | Isopropylamine | 0.60 | Ethyl isopropylzinc | 5.66 | 64 | 3.22 |
| 25 | do | N-methylaniline | 1.08 | Di-n-hexylzinc | 9.32 | 86 | 2.68 |
| 26 | Tert-butyl glycidyl ether | Tert-butylamine | 0.73 | Di-n-butylzinc | 7.40 | 67 | 2.10 |
| 27 | Cyclohexyl glycidyl ether | Cyclohexylamine | 1.00 | do | 7.40 | 98 | 1.92 |
| 28 | Allylglycidyl ether | Octadecylamine | 1.30 | do | 7.40 | 55 | 2.05 |
| 29 | Glycidyl methacrylate | Diphenylamine | 1.46 | do | 7.40 | 34 | 1.52 |

EXAMPLE 30

Poly-isobutylene oxide having a reduced specific viscosity of 3.55 (melting point 166° C.) as prepared in Example 14 is hot pressed to make a board 3 mm. thick, which is stretched with a roll at 175° C. two orthogonal directions. By narrowing the roll clearance gradually a film of 0.3 mm. thickness is prepared. The film thus prepared is thoroughly transparent and shows well developed crystal structure under polarization microscope observation. This film has a tensile strength of 931 kg./cm.$^2$ and an elongation of 18%.

It shows no substantial decrease of strength in the range of temperature from −50° C. to 140° C. and is not impaired by folding 300 times. It is insoluble in almost all organic solvents. On the contrary a film with thickness of 0.3 mm. prepared only by hot pressing has a tensile strength of 423 kg./cm.$^2$, is opaque and is severely impaired by folding 2 times.

thickness of about 100μ. The film was stretched double in biaxial direction in a thermostat heated at 140–150° C., thereby to obtain the stretched film of about 50μ thick.

Table 4 shows the physical properties of the films, unstretched and stretched.

TABLE 4

|  | Unstretched film | Stretched film |
|---|---|---|
| Tensile strength (kg./cm.$^2$) | 480 | 1,220 |
| Elongation (percent) | 260 | 60 |

The stretched film was transparent and well fit for printing.

What is claimed is:

1. Process for preparing a high molecular weight polymer of isobutylene oxide or mixtures thereof with at least one other epoxide having the formula

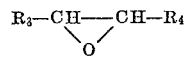

wherein $R_3$ is hydrogen or an alkyl group containing up to 2 carbon atoms, when $R_3$ is hydrogen $R_4$ is (a) an alkyl, alkenyl or aryl group with up to 12 carbon atoms, (b) —$CH_2$—$OR_5$ or (c)

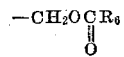

wherein $R_5$ and $R_6$ are alkyl, cycloalkyl, alkenyl or aryl with up to 18 carbon atoms; when $R_3$ is an alkyl group, $R_4$ is an alkyl group with up to two carbon atoms, said isobutylene oxide being present in an amount of at least 70% by weight, comprising contacting the monomers under polymerizing conditions in the presence of a catalyst consisting essentially of (1) an organozinc compound having the formula ZnRR' wherein R and R' are lower alkyl groups having 1–8 carbon atoms, (2) water and (3) a monoamine having the formula $R_1$—NH—$R_2$ wherein $R_1$ is a hydrogen or a hydrocarbon radical selected from alkyl, cycloalkyl, aryl and aralkyl groups with up to 18 carbon atoms, and $R_2$ is a hydrocarbon radical selected from alkyl, cycloalkyl, aryl and aralkyl groups with up to 18 carbon atoms, the molar ratio of said organozinc compound:water:said monoamine being 1:0.1–1.0:0.01–1.0.

2. A process according to claim 1 in which the molar ratio of said organozinc compound:water:said monoamine is 1:0.2–0.7:0.1–0.8.

3. A process according to claim 1 wherein said monoamines are selected from the group consisting of diethylamine, isopropylamine, n-butylamine, t-butylamine, cyclohexylamine, aniline, N-methylaniline, benzylamine, α-phenylethylamine, β-phenylethylamine, diphenylamine, and phenyl-α-naphthylamine.

4. A process according to claim 1 wherein said organozinc compound is selected from diethyl zince and di-n-butylzinc.

5. A method according to claim 1 in which isobutylene oxide is homopolymerized.

6. A process according to claim 1 in which isobutylene oxide in a quantity of at least 70% by weight is interpolymerized with at least one other epoxide selected from the group consisting of ethylene oxide, 1,2-propylene oxide, 1,2-butylene oxide, 2,3-butylene oxide, allylglycidyl ether, glycidyl methacrylate, phenyl glycidyl ether, ethylglycidyl ether, propylglycidyl ether, and cyclohexyl glycidyl ether.

References Cited

UNITED STATES PATENTS

| | | |
|---|---|---|
| 3,313,741 | 4/1967 | Uelzmann et al. _____ 260—835 |
| 3,284,374 | 11/1966 | Daimon et al. |
| 3,354,097 | 11/1967 | Vandenberg. |

WILLIAM H. SHORT, Primary Examiner

T. PERTILLA, Assistant Examiner

U.S. Cl. X.R.

252—431; 260—47, 88.3